United States Patent
Panciroli

(10) Patent No.: US 9,926,863 B2
(45) Date of Patent: Mar. 27, 2018

(54) METHOD TO CONTROL A WASTEGATE VALVE IN A TURBOCHARGED INTERNAL COMBUSTION ENGINE

(71) Applicant: Magneti Marelli S.p.A., Corbetta (IT)

(72) Inventor: Marco Panciroli, Bologna (IT)

(73) Assignee: Magneti Marelll S.p.A., Corbetta (IT)

( * ) Notice: Subject to any disclaimer, the term of this patent is extended or adjusted under 35 U.S.C. 154(b) by 0 days.

(21) Appl. No.: 14/538,079

(22) Filed: Nov. 11, 2014

(65) Prior Publication Data
US 2015/0128586 A1     May 14, 2015

(30) Foreign Application Priority Data

Nov. 12, 2013   (IT) .............. BO2013A0618

(51) Int. Cl.
| F02D 23/00 | (2006.01) |
| F02B 33/44 | (2006.01) |
| F02D 41/00 | (2006.01) |
| F02B 37/12 | (2006.01) |
| F02B 37/18 | (2006.01) |
| F02B 25/14 | (2006.01) |

(Continued)

(52) U.S. Cl.
CPC ........ *F02D 41/0007* (2013.01); *F02B 25/145* (2013.01); *F02B 37/127* (2013.01); *F02B 37/183* (2013.01); *F02D 13/0261* (2013.01); *F02D 23/00* (2013.01); *F02D 41/1401* (2013.01); *F02D 2041/1413* (2013.01); *F02D 2041/1433* (2013.01); *Y02T 10/144* (2013.01); *Y02T 10/18* (2013.01)

(58) Field of Classification Search
CPC ...... F02B 37/18; F02B 37/183; F02B 37/186; F02D 41/0007; F02D 41/1401; F02D 23/00
USPC ........................................... 60/602; 701/102
See application file for complete search history.

(56) References Cited

U.S. PATENT DOCUMENTS

| 8,443,601 B2 * | 5/2013 | Panciroli ............. F02D 41/0007 60/602 |
| 8,515,647 B2 * | 8/2013 | Panciroli ............. F02D 41/0007 60/602 |

(Continued)

FOREIGN PATENT DOCUMENTS

| EP | 2 094 959 | 7/2008 |
| EP | 2 208 877 A1 | 7/2010 |

(Continued)

OTHER PUBLICATIONS

Jul. 28, 2014 Italian Search Report for Italian Patent Application No. BO20130618.

*Primary Examiner* — Ngoc T Nguyen
(74) *Attorney, Agent, or Firm* — Howard & Howard Attorneys PLLC

(57) ABSTRACT

A method to control the wastegate valve wastegate in a turbocharged internal combustion engine suited to allow air to directly flow from the intake manifold to the exhaust manifold; the method providing for determining a control law which provides an objective opening of an actuator controlling the wastegate valve as a function of a contribution in the absence of air flow directly from the intake manifold to the exhaust manifold and a contribution as a function of the quantity of air directly flowing from the intake manifold to the exhaust manifold.

12 Claims, 6 Drawing Sheets

(51) Int. Cl.
    *F02D 13/02*    (2006.01)
    *F02D 41/14*    (2006.01)

(56)         References Cited

U.S. PATENT DOCUMENTS

2007/0251233 A1   11/2007  Bardoll et al.
2009/0070014 A1    3/2009  Miyashita
2015/0068191 A1*   3/2015  Panciroli ................. F02B 37/18
                                                        60/273

FOREIGN PATENT DOCUMENTS

EP         2 314 850 A1    4/2011
WO        2008/081283 A2    7/2008

* cited by examiner

METHOD TO CONTROL A WASTEGATE VALVE IN A TURBOCHARGED INTERNAL COMBUSTION ENGINE

CROSS-REFERENCE TO RELATED APPLICATION

This application is based upon and claims priority to Italian Patent Application No. BO2013A000618, filed on Nov. 12, 2013.

BACKGROUND OF THE INVENTION

1. Field of Invention

The present invention relates to a method to control a wastegate valve in an internal combustion engine turbocharged by a turbocharger.

2. Description of the Related Art

As is known, some internal combustion engines are provided with a turbocharger supercharging system which is able to increase the power developed by the engine by exploiting the enthalpy of exhaust gases for compressing the air drawn by the engine and thus increase the volumetric efficiency of the intake.

A turbocharger supercharging system includes a turbocharger provided with a turbine, which is arranged along an exhaust conduit for rotating at high speed under the thrust of the exhaust gases expelled from the engine, and a compressor, which is brought in rotation by the turbine and is arranged along the air supply conduit to compress the air drawn by the engine. In a turbocharger supercharging system it is necessary to maintain the operating range of the turbocharger within a useful zone depending on the engine point both for functional reasons (i.e. to prevent irregular operation or in any case low efficiency), and for structural reasons (i.e. to prevent damage to the turbocharger). In order to limit the supercharging pressure (i.e. the pressure of the compressed air downstream of the compressor), a by-pass conduit controlled by a wastegate valve is arranged in parallel to the turbine; when the wastegate valve opens, a part of the exhaust gases flows along the by-pass conduit, and thus by-passes the turbine, and this leads to a reduction in the rotation speed of the impeller and, thereby, to a reduction in the supercharge.

In order to control the wastegate valve, a pneumatic actuator controlled by a control solenoid valve is used which allows controlling the intervention of the wastegate valve. The pneumatic actuator includes a sealed shell which internally supports a flexible membrane, which divides the sealed shell in two mutually watertight chambers. The flexible membrane is mechanically connected to a rigid rod which controls the wastegate valve for controlling the opening and closing of the wastegate valve itself. A first chamber is connected to the atmospheric pressure while a second chamber is connected to the supercharging pressure and is also connectable to the atmospheric pressure through a conduit controlled by the proportional control solenoid valve which is adapted to choke the conduit between a closed position, in which the conduit is completely closed, and a maximum opening position.

A contrast spring is arranged in the first chamber which is compressed between a wall of the shell and the flexible membrane and leans on the flexible membrane on the opposite side of the rod. When the pressure difference between the two chambers is lower than an intervention threshold (determined by the preload of the contrast spring), the rod keeps the wastegate valve in a fully closed position, while when the pressure difference between the two chambers is higher than the intervention threshold, the contrast spring starts to compress under the thrust of the flexible membrane which thus gets deformed, causing a displacement of the rod which accordingly moves the wastegate valve towards the opening position. By controlling the control solenoid valve it is possible to connect the second chamber to the atmospheric pressure with a variable passage gap, thus it is possible to adjust the pressure difference between the two chambers which, in turn, causes the opening or closing of the wastegate valve. It should be noted that until the difference between the supercharging pressure and the atmospheric pressure does not exceed the intervention threshold (equal to the preload generated by the contrast spring divided by the flexible membrane area), the wastegate valve cannot be opened by the action that is exerted by the control solenoid valve (which can only reduce and not increase the difference between the supercharging pressure and the atmospheric pressure).

In internal combustion engines known, an objective supercharging pressure is generated which is used to generate a control of the wastegate valve by adding an open loop contribution and a closed loop contribution: the open loop contribution is generated by using a control map obtained experimentally while the closed loop contribution is provided by a PID regulator which tries to cancel a pressure error, i.e. a difference between the objective supercharging pressure and the actual supercharging pressure measured by a sensor.

However, the preload generated by the contrast spring of the pneumatic actuator has a high construction dispersion, a considerable thermal drift, and also a certain time drift. Furthermore, the pneumatic actuator has a considerable hysteresis, i.e. the behavior of the pneumatic actuator significantly varies between the opening movement and the contrary closing movement. Accordingly, the control map used for determining the closed loop contribution is strongly non-linear and the pursuing of the objective supercharging pressure is complicated; therefore, in known internal combustion engines, pursuing the objective supercharging pressure tends to have large overshoots or undershoots (i.e. the actual supercharging pressure exceeds or is even considerably lower than the objective supercharging pressure), and thus generate oscillations, especially when the supercharging pressure is astride the intervention threshold below which the wastegate valve cannot be opened by the action exerted by the control solenoid valve.

Overshoots (i.e. peaks) of the supercharging pressure cause significant (and therefore potentially harmful in time) stresses in the mechanical components of the internal combustion engine. Overshoots may generate both a noise perceptible by the occupants of the vehicle and corresponding undesired oscillations in the drive torque generated by the internal combustion engine.

In order to reduce the extent of overshoots, it is possible to reduce the additional contribution of the PID regulator used to calculate the closed loop control contribution of the wastegate valve.

For example, patent EP2314850 describes a method for controlling the wastegate valve including the steps of determining, in a design step, a control law which provides an objective opening of an actuator controlling the wastegate valve as a function of a supercharging pressure; determining an objective supercharging pressure; measuring an actual supercharging pressure; determining a first open loop contribution of an objective position of the actuator controlling the wastegate valve by the control law and as a function of the objective supercharging pressure; determining a second closed loop contribution of the objective position of the actuator controlling the wastegate valve; calculating the objective position of the actuator controlling the wastegate valve by adding the two contributions; and controlling the actuator controlling the wastegate valve for pursuing the objective position of the actuator controlling the wastegate valve.

The method further includes the steps of determining the second closed loop contribution provides for determining a fictitious position of the actuator controlling the wastegate valve by the control law and as a function of the actual supercharging pressure; calculating a position error by calculating the difference between the first open loop contribution of the objective position of the actuator controlling the wastegate valve and the fictitious position of the actuator controlling the wastegate valve; and determining the second closed loop contribution by processing the position error by a first regulator which tries to cancel the position error itself.

However, the control method described in patent EP2314850 is quite robust, ready and free from oscillations only in the operating condition in which there is no significant air flow from the intake manifold directly to the exhaust of the internal combustion engine 1.

SUMMARY OF THE INVENTION

The object of the present invention is to provide a method to control a wastegate valve in an internal combustion engine turbocharged by a turbocharger, which correction method is free from the drawbacks described above and, in particular, is easy and cost-effective to be implemented.

As set forth in the present invention, a method to control a wastegate valve in an internal combustion engine turbocharged by means of a turbocharger provided with a turbine and with a compressor is disclosed. The internal combustion engine comprises an intake manifold and an exhaust manifold with the internal combustion engine being suited to allow air to directly flow from the intake manifold to the exhaust manifold. The method includes the steps of determining an objective supercharging pressure, measuring an actual supercharging pressure, and determining, in a design phase, a control law, which provides an objective opening of an actuator controlling the wastegate valve as a function of the mass flow rate, preferably the reduced mass flow rate, of the compressor and, selectively, as a function of the objective compression ratio resulting from the ratio between the objective supercharging pressure and the pressure upstream of the compressor or of the compression ratio resulting from the ratio between the actual supercharging pressure and the pressure upstream of the compressor.

The method further includes the steps of determining a first open loop contribution of an objective position of the actuator controlling the wastegate valve by means of the control law, which is a function of the objective compression ratio, determining a second closed loop contribution of the objective position of the actuator controlling the wastegate valve by means of the control law, which is a function of the compression ratio, calculating the objective position of the actuator controlling the wastegate valve by adding the first open loop contribution and the second closed loop contribution, and controlling the actuator controlling the wastegate valve so as to pursue the objective position of the actuator controlling the wastegate valve.

The control method is characterised in that the step of determining, in a design phase, a control law, which provides an objective opening of an actuator controlling the wastegate valve, includes the sub-steps of determining a contribution of the objective position of the actuator controlling the wastegate valve in the absence of air directly flowing from the intake manifold to the exhaust manifold, determining a contribution of the objective position of the actuator controlling the wastegate valve, which indicates the quantity of air directly flowing from the intake manifold to the exhaust manifold, and determining the first open loop contribution of an objective position of the actuator controlling the wastegate valve and/or the second closed loop contribution of the objective position of the actuator controlling the wastegate valve by means of the algebraic sum of the contribution in the absence of air directly flowing from the intake manifold to the exhaust manifold and of the contribution indicating the quantity of air directly flowing from the intake manifold to the exhaust manifold.

BRIEF DESCRIPTION OF THE DRAWINGS

The present invention will now be described with reference to the accompanying drawings, which show a non-limiting example thereof.

DETAILED DESCRIPTION OF THE INVENTION

Figure 1:
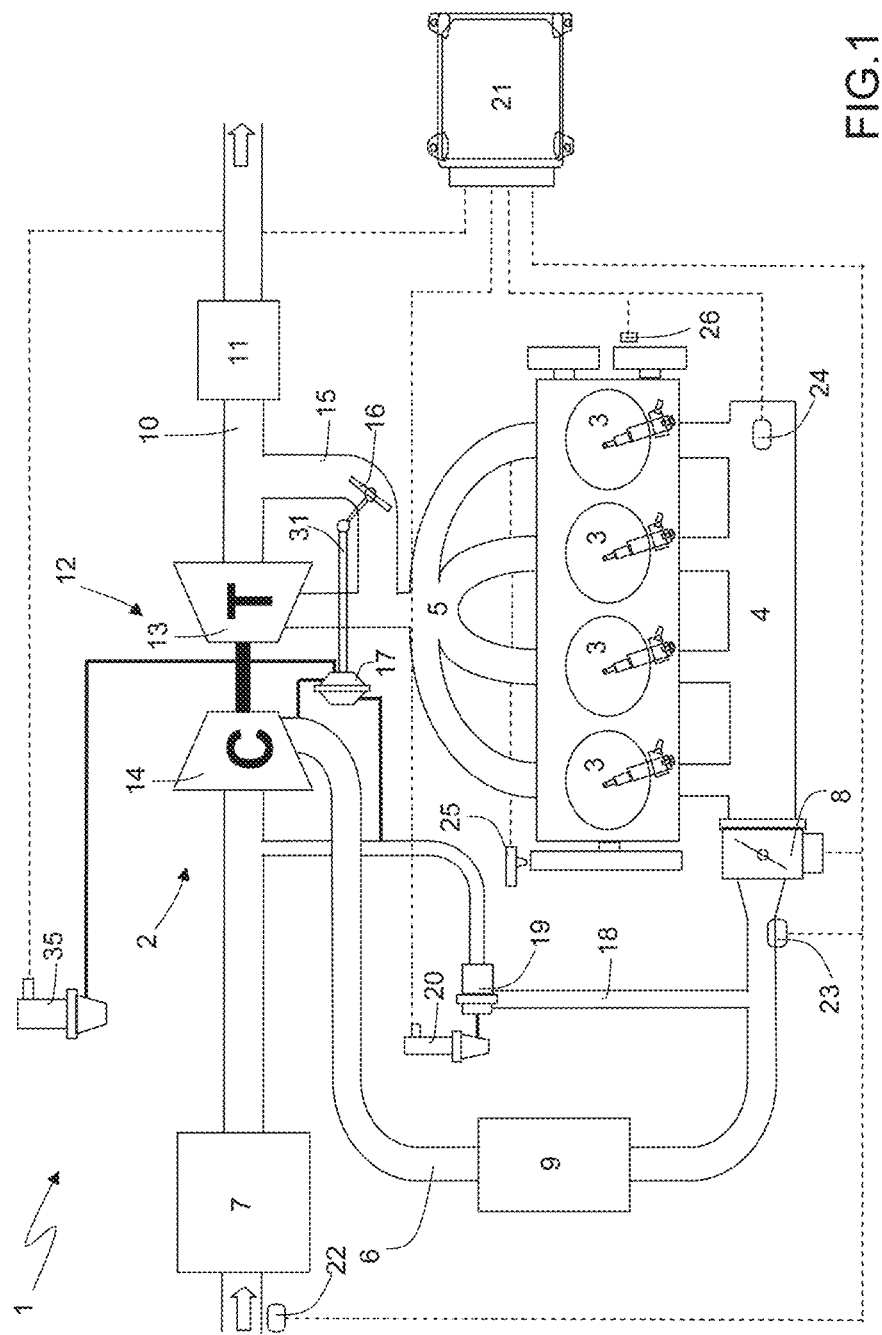
FIG. 1 is a schematic view of an internal combustion engine supercharged by a turbocharger and provided with a control unit which implements the method to control a wastegate valve object of the present invention.

In FIG. 1, reference numeral 1 globally indicates an internal combustion engine supercharged by a turbocharger supercharging system 2.

The internal combustion engine 1 includes four cylinders 3, each of which is connected to an intake manifold 4 by at least one respective intake valve and to an exhaust manifold 5 by at least one respective exhaust valve. The intake manifold 4 receives fresh air (i.e. air from the external environment) through an intake conduit 6, which is provided with an air filter 7 and is controlled by a throttle valve 8. An intercooler 9 having the function of cooling the intake air is arranged along the intake conduit 6. An exhaust conduit 10 is connected to the exhaust manifold 5 which feeds the exhaust gases produced by the combustion to an exhaust system, which releases the gases produced by combustion into the atmosphere and normally includes at least one catalyst 11 and at least one silencer arranged downstream of catalyst 11.

The supercharging system 2 of the internal combustion engine 1 includes a turbocharger 12 provided with a turbine 13, which is arranged along the exhaust conduit 10 to rotate at high speed under the action of the exhaust gases ejected through cylinders 3, and a compressor 14, which is arranged along the intake conduit 6 and is mechanically connected to turbine 13 to be rotated by turbine 13 itself so as to increase the pressure of the air fed in the feeding conduit 6.

A by-pass conduit 15 is provided along the exhaust conduit 10, which is connected in parallel to turbine 13 so as to have the ends thereof connected upstream and downstream of turbine 13 itself; a wastegate valve 16 is arranged along the by-pass conduit 15, which is adapted to control the flow rate of the exhaust gases flowing through the by-pass conduit 15 and is controlled by a pneumatic actuator 17. A by-pass conduit 18 is provided along the intake conduit 6, which is connected in parallel to compressor 14 so as to have the ends thereof connected upstream and downstream of compressor 14 itself; a valve Poff 19 is arranged along the by-pass conduit 18, which is adapted to control the air flow rate flowing through the by-pass conduit 18 and is controlled by an electrical actuator 20.

The internal combustion engine 1 is controlled by an electronic control unit 21, which supervises the operation of all components of the internal combustion engine 1, among which the supercharging system 2. In particular, the electronic control unit 21 controls actuators 17 and 20 of the wastegate valve 16 and of the Poff valve 19. The electronic control unit 21 is connected to sensors 22 which measure the temperature and the pressure along the intake conduit 6 upstream of compressor 14, to sensors 23 which measure the temperature and the pressure along the intake conduit 6 upstream of the throttle valve 8, and to sensors 24 which measure the temperature and the pressure inside the intake manifold 4. Moreover, the electronic control unit 21 is connected to a sensor 25 which measures the angular position (and thus the rotation speed) of a drive shaft of the internal combustion engine 1 and a sensor 26 which measures the phase of the intake and/or exhaust valves.

Figure 2:
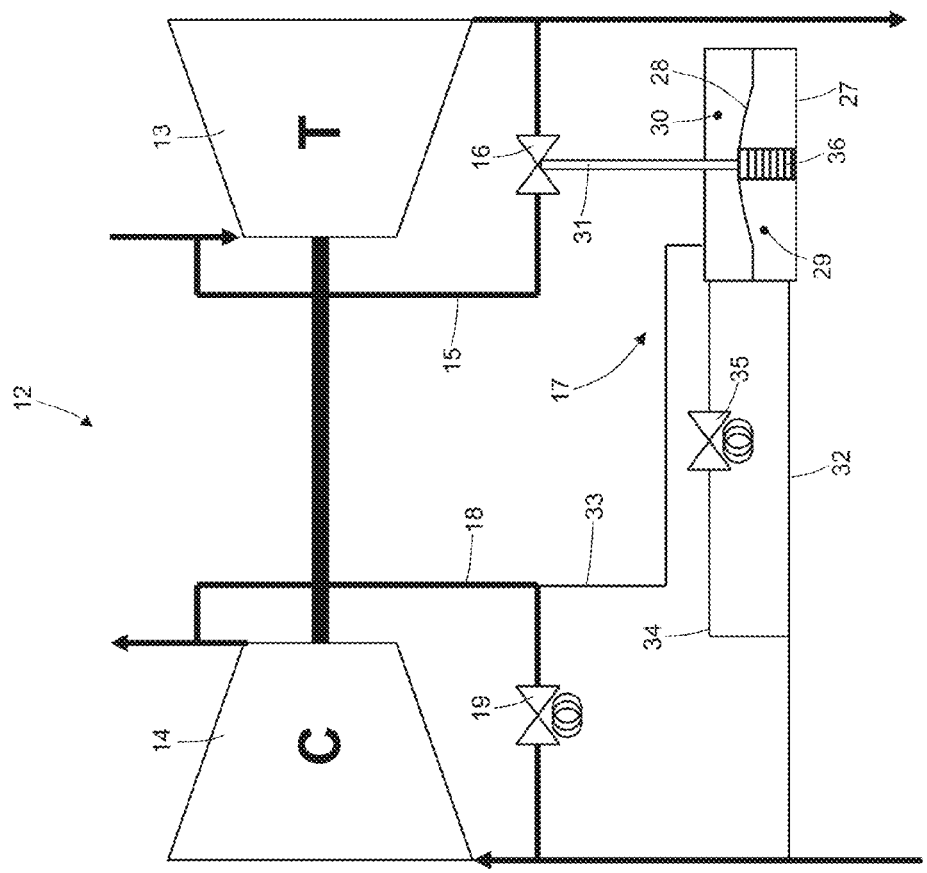
FIG. 2 is a schematic view of a pneumatic actuator of the wastegate valve.

As shown in FIG. 2, the pneumatic actuator 17 of the wastegate valve 16 includes a sealed shell 27 which internally supports a flexible membrane 28, which divides the sealed shell 27 into two mutually isolated chambers 29 and 30. The flexible membrane 28 is mechanically connected to a rigid rod 31 which controls the wastegate valve 16 for controlling the opening and closing of the wastegate valve 16 itself. Chamber 29 is connected by a conduit 32 to the pressure upstream of compressor 14 (which may or may not coincide with the atmospheric pressure $P_{atm}$), while chamber 30 is connected by a conduit 33 to the supercharging pressure (drawn downstream of compressor 14) and is connected by a conduit 34 to the pressure upstream of compressor 14 (which may or may not coincide with the atmospheric pressure $P_{atm}$). Conduit 34 is not free but is controlled by a control solenoid valve 35 which is adapted to choke conduit 34 between a closed position, in which conduit 34 is completely closed, and a maximum opening position.

A contrast spring 36 is arranged in chamber 29 which is compressed between a wall of shell 27 and the flexible membrane 28 and leans on the flexible membrane 28 on the opposite side of rod 31. When the pressure difference between chamber 30 and chamber 29 is lower than an intervention threshold (determined by the preload of the contrast spring 36), rod 31 keeps the wastegate valve 16 in a fully closed position, while when the pressure difference between chamber 30 and chamber 29 is higher than the intervention threshold, the contrast spring 36 starts to compress under the thrust of the flexible membrane 28 which thus gets deformed, causing a displacement of rod 31 which accordingly moves the wastegate valve 16 towards the opening position. By controlling the control solenoid valve 35 it is possible to connect chamber 30 to the atmospheric pressure with a variable passage gap, thus it is possible to adjust the pressure difference between the two chambers 29 and 30 which, in turn, causes the opening or closing of the wastegate valve 16.

It should be noted that until the difference between the supercharging pressure P and the pressure upstream of compressor 14 (which may or may not coincide with the atmospheric pressure $P_{atm}$) does not exceed the intervention threshold (equal to the preload generated by the contrast spring 36 divided by the flexible membrane 28 area), the wastegate valve 16 cannot be opened by the action that is exerted by the control solenoid valve 35 (which can only reduce and not increase the difference between the supercharging pressure P and the pressure upstream of compressor 14 which may or may not coincide with the atmospheric pressure $P_{atm}$). Due to the construction dispersion, to the thermal drift, and to the time drift, the preload generated by the contrast spring 36 is known only with a quite relevant uncertainty (in the order of ±20%).

Figure 3:
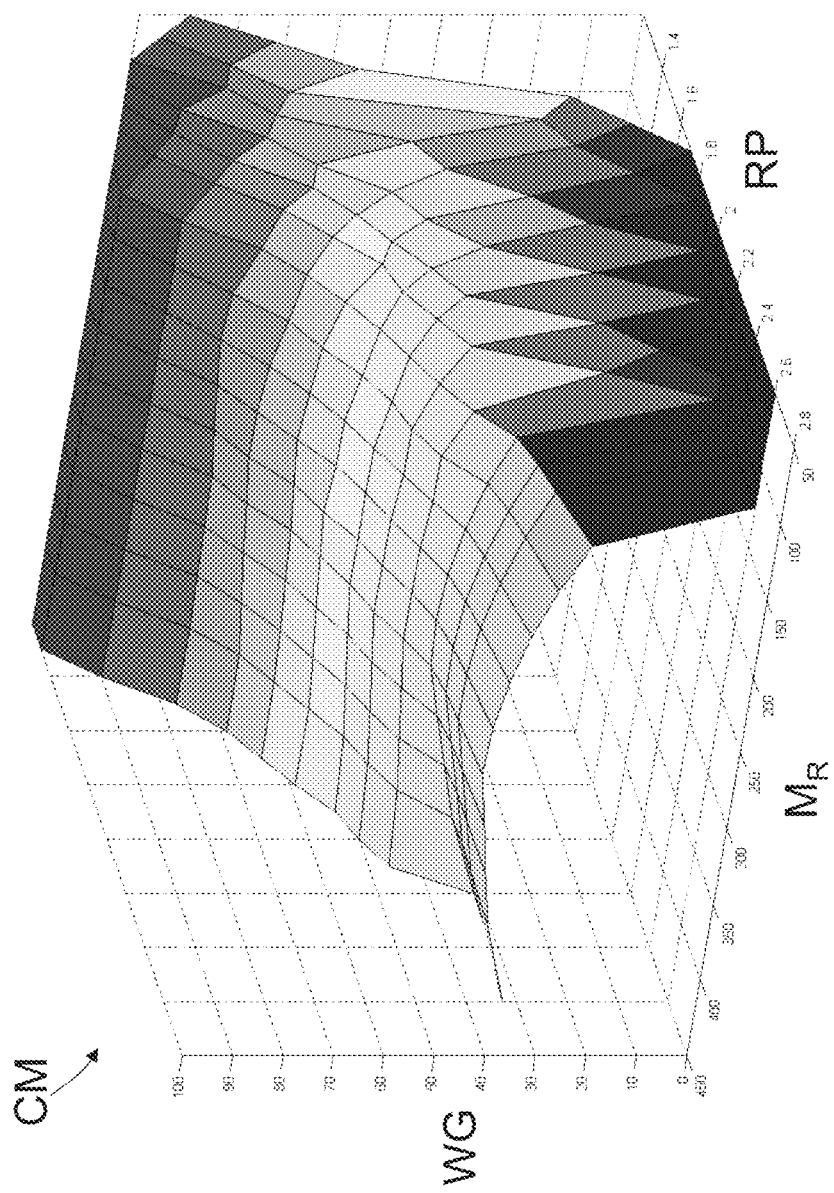
FIG. 3 is a graph showing an experimental control map.

In a design step of the internal combustion engine 1, a control law CL is determined experimentally which provides an objective opening WG of the solenoid valve 35 controlling the wastegate valve 16 as a function of a supercharging pressure P (or rather a supercharging ratio RP which is equal to the ratio between the supercharging pressure P and the pressure upstream of compressor 14, which may or may not coincide with the atmospheric pressure $P_{atm}$) and a reduced mass flow rate $M_R$ of compressor 14. In other words, the control law CL provides the opening WG of the solenoid valve 35 controlling the wastegate valve 16 which should allow obtaining a desired supercharging pressure P (or rather a desired supercharging ratio RP) in the presence of a certain reduced mass flow rate $M_R$. As set forth in one embodiment shown for example in FIG. 3, the control law CL includes an experimental map (i.e. a table or rather a matrix) (which, as is clear in FIG. 3, is strongly non-linear); alternatively, the control law CL may include a mathematical function. The control law CL is stored to a memory of the electronic control unit 21 to be used as described hereafter.

In use, during the normal operation of the internal combustion engine 1, the electronic control unit 21 measures the actual supercharging pressure P (i.e. the air pressure along the intake conduit 6 downstream of compressor 14), measures or estimates the pressure upstream of compressor 14 (which may or may not coincide with the atmospheric pressure $P_{atm}$) and estimates the actual reduced mass flow rate $M_R$ of compressor 14. Furthermore, during the normal operation of the internal combustion engine 1, the electronic control unit 21 determines an objective supercharging pressure $P_{obj}$ that should be pursued by controlling, if necessary, the solenoid valve 35 controlling the wastegate valve 16. In order to control the solenoid valve 35 controlling the wastegate valve 16, the electronic control unit 21 determines an objective position $WG_{obj}$ of the solenoid valve 35 controlling the wastegate valve 16 which is generally implemented with an open loop control.

Figure 4:
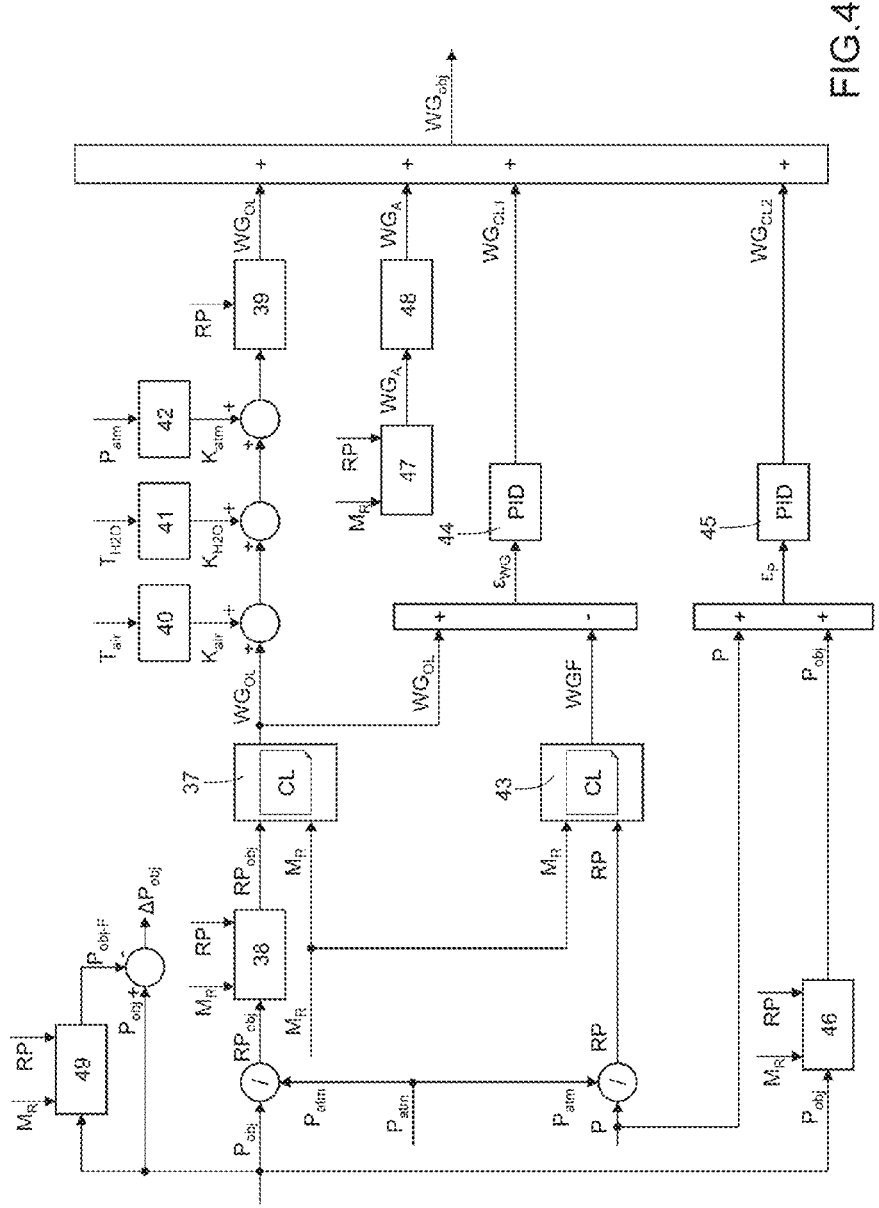
FIGS. 4 to 6 are block diagrams of a control logic of the wastegate valve.

As shown in FIG. 4, the objective position $WG_{obj}$ of the solenoid valve 35 controlling the wastegate valve 16 is calculated by algebraically (i.e. taking the sign into account) adding four contributions: an open loop contribution $WG_{OL}$, a closed loop contribution $WG_{CL1}$, a closed loop contribution $WG_{CL2}$, and an adaptive contribution $WG_A$.

The open loop contribution $WG_{OL}$ is determined using the control law CL: an objective compression ratio $RP_{obj}$ (which is equal to the ratio between the objective supercharging pressure $P_{obj}$ and the pressure upstream of compressor 14 which may or may not coincide with the atmospheric pressure $P_{atm}$) is determined as a function of the objective supercharging pressure $P_{obj}$; then, the objective compression ratio $RP_{obj}$ and the actual reduced mass flow rate $M_R$ are provided to a calculation block 37 which, using the control law CL, provides the open loop contribution $WG_{OL}$.

Advantageously, before being provided to the calculation block 37, the objective compression ratio $RP_{obj}$ is filtered by a low-pass filter 38 of the first order to reduce the variation rate; in other words, the objective compression ratio $RP_{obj}$ is filtered by the low-pass filter 38 so as to slow down the evolution of the objective compression ratio $RP_{obj}$, thus "smoothing" any step changes. The function of the low-pass filter 38 is to make the evolution of the objective compression ratio $RP_{obj}$ more "real" (i.e. more adherent to what occurs in reality), since it is clear that step (or in any case very fast) changes in the actual supercharging pressure P are not possible due to apparent physical limits due to the inertia involved. As set forth in one embodiment, a cutoff frequency of the low-pass filter 38 is determined as a function of the reduced mass flow rate $M_R$ of compressor 14 and of the actual supercharging ratio RP as set forth in a law determined experimentally.

As set forth in one embodiment, the open loop contribution $WG_{OL}$ provided by the calculation block 37 is first compensated by three compensation parameters $K_{atm}$, $K_{H2O}$ and $K_{air}$ and is then filtered through a low-pass filter 39 of the first order to reduce the variation rate. The compensation parameter $K_{air}$ is determined by a calculation block 40 as a function of the temperature $T_{air}$ of the intake air and using a linear equation having experimentally determined coefficients, the compensation parameter $K_{H2O}$ is determined by a calculation block 41 as a function of the temperature $T_{H2O}$ of a cooling liquid of the internal combustion engine 1 and using a linear equation having experimentally determined coefficients, and the compensation parameter $K_{atm}$ is determined by a calculation block 42 as a function of the pressure upstream of compressor 14 (which may or may not coincide with the atmospheric pressure $P_{atm}$) and using a linear equation having experimentally determined coefficients; the coefficients of the linear equation which provides the compensation parameter $K_{atm}$ as a function of the pressure upstream of compressor 14 (which may or may not coincide with the atmospheric pressure $P_{atm}$) may not be constant but vary as a function of the reduced mass flow rate $M_R$ of compressor 14 and of the actual supercharging ratio RP as set forth in a law determined experimentally.

The open loop contribution $WG_{OL}$ is filtered by the low-pass filter 39 so as to slow down the evolution of the open loop contribution $WG_{OL}$ thus "smoothing" any step changes. The function of the low-pass filter 39 is to make the evolution of the open loop contribution $WG_{OL}$ more "real" (i.e. more adherent to what occurs in reality), since it is clear that step (or in any case very fast) changes in the position of the control solenoid valve 35 are not possible due to apparent physical limits due to the inertia involved. As set forth in one embodiment, a cutoff frequency of the low-pass filter 39 is determined as a function of the actual supercharging ratio RP as set forth in a law determined experimentally. As set forth in one embodiment, the open loop contribution $WG_{OL}$ is filtered by the low-pass filter 39 asymmetrically: the open loop contribution $WG_{OL}$ is filtered by the low-pass filter 39 only when the open loop contribution $WG_{OL}$ varies to open the wastegate valve 16 and not when the open loop contribution $WG_{OL}$ varies to close the wastegate valve 16; in this way, the intervention of compressor 14 is faster (more reactive), thus favoring the response promptness of the internal combustion engine 1 (thus reducing the "turbo-lag") while the switching off of compressor 14 is smoother. It should be noted that when the maximum performance is sought, an "abrupt" reaction of the internal combustion engine 1 is accepted (indeed, in some cases desired), while in other situations a "smooth" behavior, i.e. devoid of too rapid and strong interventions, is essentially desired. It should be noted that because of the presence of the low-pass filter 39, any oscillatory phenomena in the pneumatic actuator 17 of the wastegate valve 16 are also eliminated or greatly attenuated; this result is achieved by virtue of the fact that the action of the low-pass filter 39 prevents providing the flexible membrane 28 and the contrast spring 36 with too rapid stresses which may trigger oscillatory phenomena.

The closed loop contribution $WG_{CL1}$ of the objective position $WG_{obj}$ of the controlling solenoid valve 35 controlling the wastegate valve 16 is obtained by using as a feedback variable a fictitious position WGF of the wastegate valve 16 (thus a control magnitude which has no precise correspondence in physical reality) which is determined not by a direct measurement with an actual measurement sensor but using as a sensor measuring the control law CL. In other words, a calculation block 43 provides the fictitious position WGF of the wastegate valve 16 by applying the control law CL as a function of the actual supercharging pressure P (or rather the actual supercharging ratio RP) and of the reduced mass flow rate $M_R$ of compressor 14; therefore, the fictitious position WGF of the wastegate valve 16 corresponding to the position that the wastegate valve 16 should have as set forth in the control law CL (and thus affected by all the errors of the control law CL) in conjunction with the actual supercharging ratio RP and the actual reduced mass flow rate $M_R$ of compressor 14. The fictitious position WGF of the wastegate valve 16 is compared with the open loop contribution $WG_{OL}$ that corresponds to the position that the wastegate valve 16 should have as set forth in the control law CL (and thus affected by all the errors of the control law CL) in conjunction with the objective compression ratio $RP_{obj}$ and the actual reduced mass flow rate $M_R$ of compressor 14; in other words, the open loop contribution $WG_{OL}$ represents an objective of the fictitious position WGF as it is calculated using the objective compression ratio $RP_{obj}$. In particular, a position error $C_{WG}$ is calculated by calculating the difference between the open loop contribution $WG_{OL}$ of the objective position $WG_{obj}$ of the solenoid valve 35 controlling the wastegate valve 16 and the fictitious position WGF of the wastegate valve 16 and such a position error $C_{WG}$ is provided to a PID regulator 44 which tries to cancel the position error $C_{WG}$ itself.

The fact of comparing two values (the open loop contribution $WG_{OL}$ representing an objective of the fictitious position WGF and the fictitious position WGF) obtained by the control law CL allows compensating the errors of the control law CL and linearizing the strongly non-linear behavior of the wastegate valve 16; in this way, the PID regulator 44 may work with greater stability and the calibration of the control parameters (i.e. proportional, integrative, derivative coefficients and saturation thresholds) of the PID regulator 44 is relatively simple. Furthermore, the control loop of the PID regulator 44 is self-compensated with respect to the temperature $T_{air}$ of the intake air, the temperature $T_{H2O}$ of a cooling liquid of the internal combustion engine 1, and the atmospheric pressure $P_{atm}$.

The closed loop contribution $WG_{CL2}$ of the objective position $WG_{obj}$ of the solenoid valve 35 controlling the wastegate valve 16 is determined by using the supercharging pressure P as feedback variable; then, a pressure error $\epsilon_P$ is calculated by calculating the difference between the objective supercharging pressure $P_{obj}$ and the actual supercharging pressure P and the pressure error $\epsilon_{WG}$ is provided to a PID regulator 45 which tries to cancel the pressure error $C_{WG}$ itself.

Advantageously, before being compared with the actual supercharging pressure P, the objective supercharging pressure $P_{obj}$ is filtered by a low-pass filter 46 of the first order to reduce the variation rate; in other words, the objective supercharging pressure $P_{obj}$ is filtered by the low-pass filter 46 so as to slow down the evolution of the objective supercharging pressure $P_{obj}$, thus "smoothing" any step changes. The function of the low-pass filter 46 is to make the evolution of the objective supercharging pressure $P_{obj}$ more "real" (i.e. more adherent to what occurs in reality), since it is clear that step (or in any case very fast) changes in the actual supercharging pressure P are not possible due to apparent physical limits due to the inertia involved. As set forth in one embodiment, a cutoff frequency of the low-pass filter 46 is determined as a function of the reduced mass flow rate $M_R$ of compressor 14 and of the actual supercharging ratio RP as set forth in a law determined experimentally.

In order to prevent harmful interferences between the action of regulator 44 and the action of regulator 45, the dynamics of regulator 44 is different from the dynamics of regulator 45; in particular, regulator 44 is essentially proportional and derivative (i.e. has high proportional and derivative coefficients and a small integral coefficient) in order to be ready (i.e. act quickly) while regulator 45 is essentially integral (i.e. has small proportional and derivative coefficients and a high integral coefficient) to ensure the convergence between the objective supercharging pressure $P_{obj}$ and the actual supercharging pressure P. Therefore, regulator 44 is used to react quickly and promptly to the variations in the objective supercharging pressure $P_{obj}$, while regulator 45 is used to make the actual supercharging pressure P converge to the objective supercharging pressure $P_{obj}$ at the end of the transient.

The adaptive contribution $WG_A$ of the objective position $WG_{obj}$ of the solenoid valve 35 controlling the wastegate valve 16 is essentially a "historical memory" of the previous implementations of the wastegate valve 16 and takes into account the control interventions carried out in the past. The adaptive contribution $WG_A$ is stored to a memory 47 of the electronic control unit 21 and is cyclically updated when turbocharger 12 is at a steady speed (for example when the reduced mass flow rate $M_R$ of compressor 14 and the supercharging ratio RP remain approximately constant for at least a time interval of predetermined duration) and using an integral term of the PID regulator 45 and/or of the PID regulator 44; basically, the adaptive contribution $WG_A$ is equal to an "average" of the past integral terms of the PID regulator 45 and/or of the PID regulator 44 at steady schemes of turbocharger 12. The adaptive contribution $WG_A$ stored to memory 47 is updated when turbocharger 12 is at a steady speed, using the integral term of the PID regulator 45 and/or of the PID regulator 44 weighed by a weight W which is essentially a function of the actual position WG of the solenoid valve 35 controlling the wastegate valve 16 in such a way that weight W is minimum when the hysteresis in the control of the wastegate valve 16 is maximum; in this way, the adaptivity is frequently gradual (i.e. the last integral term of the PID regulator 45 and/or of the PID regulator 44 cannot alter the adaptive contribution $WG_A$ stored to memory 47), and uploading hysteresis-deformed values to the adaptive contribution $WG_A$ is prevented.

Generally, the adaptive contribution $WG_A$ is variable as a function of the reduced mass flow rate $M_R$ of compressor 14 and of the supercharging ratio RP. Moreover, the adaptive contribution $WG_A$ is filtered by a low-pass filter 48 of the first order to reduce the variation rate; in other words, the adaptive contribution $WG_A$ is not provided abruptly but is provided gradually to prevent step interventions which never correspond to the physical reality and thus to facilitate the control convergence. As set forth in one embodiment, the cutoff frequency of the low-pass filter 48 is constant; alternatively, the cutoff frequency of the low-pass filter 48 may be varied as a function of the reduced mass flow rate $M_R$ of compressor 14 and of the supercharging ratio RP.

The integral term of the PID regulators 44 and 45 contains a "memory" of the errors that have occurred in the recent past; therefore, when changes occur in boundary conditions, the "memory" of the errors that have occurred in the recent past contained in the integral term of the PID regulators 44 and 45 may have negative effects as it is a situation that no longer exists.

The electronic control unit 21 resets (or possibly "freezes", i.e. prevents a further growth of) each integral term of the PID regulators 44 and 45 in case of rapid variation, i.e. strong transient, of the objective supercharging pressure $P_{obj}$ if the integral term itself is high, that is, is higher in absolute value than a predefined threshold value; in other words, when there is a rapid variation in the objective supercharging pressure $P_{obj}$ and an integral term of the PID regulators 44 and 45 is higher in absolute value than a predefined threshold value, then the integral term itself is reset or frozen (i.e. is no longer made to vary until the end of strong transient).

In order to determine the presence of a strong transient of the objective supercharging pressure $P_{obj}$ (i.e. a rapid variation in the objective supercharging pressure $P_{obj}$), the electronic control unit 21 compares the objective supercharging pressure $P_{obj}$ with an objective supercharging pressure $P_{obj-F}$ filtered by a low-pass filter 38' to determine a gradient $\Delta P_{obj}$ of the objective supercharging pressure $P_{obj}$ which indicates the variation rate of the objective supercharging pressure $P_{obj}$. In other words, the gradient $\Delta P_{obj}$ of the objective supercharging pressure $P_{obj}$ is calculated by calculating the difference between the objective supercharging pressure $P_{obj}$ and the objective supercharging pressure $P_{obj-F}$ filtered by the low-pass filter 38'. When the gradient $\Delta P_{obj}$ of the objective supercharging pressure $P_{obj}$ is higher than a threshold value, then the electronic control unit 21 establishes the presence of a strong transient of the objective supercharging pressure $P_{obj}$ (i.e. a rapid variation in the objective supercharging pressure $P_{obj}$) and thus resets (or possibly "freezes") the integral term of the PID regulators 44 and 45; such a threshold value may be a function of the supercharging ratio RP and of the reduced mass flow rate $M_R$ of compressor 14. As set forth in one embodiment, a cutoff frequency of the low-pass filter 38' is determined as a function of the reduced mass flow rate $M_R$ of compressor 14 and of the actual supercharging ratio RP as set forth in a law determined experimentally.

As set forth in one embodiment, the electronic control unit 21 varies the integral coefficients of the PID regulators 44 and 45 as a function of the pressure error $\epsilon_P$, so as to vary the characteristics of the control upon the variation of the extent of the pressure error $\epsilon_P$. In particular, the electronic control unit 21 varies the integral coefficients of the PID regulators 44 and 45 in a manner inversely proportional to the pressure error $\epsilon_P$ in such a way that the smaller the pressure error $\epsilon_P$, the higher the integral coefficients of the PID regulators 44 and 45, and varies the proportional coefficients of the PID regulators 44 and 45 in a manner directly proportional to the pressure error $\epsilon_P$ in such a way that the higher the pressure error $\epsilon_P$, the higher the proportional coefficients of the PID regulators 44 and 45. In other words, the integral term of the PID regulators 44 and 45 (directly proportional to the integral coefficients of the PID regulators 44 and 45) serves to guarantee the convergence between the actual supercharging pressure P and the objective supercharging pressure $P_{obj}$ but such a convergence is reached at the end of a transient when the pressure error $\epsilon_P$ is relatively small; at the beginning of the transient, when the pressure error $\epsilon_P$ is high, the integral term of the PID regulators 44 and 45 may generate oscillations and therefore, in order to prevent this risk, the integral coefficients of the PID regulators 44 and 45 are reduced at the beginning of the transient when the pressure error $\epsilon_P$ is high. The opposite applies to the proportional terms of the PID regulators 44 and 45 (directly proportional to the proportional and derivative coefficients of the PID regulators 44 and 45) which should be high when the pressure error $\epsilon_P$ is high to ensure response promptness and should be small when the pressure error $\epsilon_P$ is small to ensure convergence.

In the low-pass filters 38, 46 and 38' described above, the cutoff frequency is determined as a function of the reduced mass flow rate $M_R$ of compressor 14 and of the actual supercharging ratio RP; as set forth in an equivalent embodiment, the cutoff frequency is determined as a function of the rotation speed of the internal combustion engine 1 and as a function of a gear engaged in a gearbox which receives motion from the internal combustion engine 1. In this regard, it is important to note that the dynamics of turbocharger 12 varies substantially as a function of the gear engaged, since in the lower gears the increase in the rotation speed of the internal combustion engine 1 is fast, thus the increase in the rotation speed of turbocharger 12 is equally rapid; on the other hand, in higher gears the increase in the rotation speed of the internal combustion engine 1 is slow, so the increase in the rotation speed of turbocharger 12 is just as slow.

Likewise, also the threshold value with which the gradient $\Delta P_{obj}$ of the objective supercharging pressure $P_{obj}$ is compared to determine whether there is a strong transient of the objective supercharging pressure $P_{obj}$ may be a function of the reduced mass flow rate $M_R$ of compressor 14 and of the actual supercharging ratio RP or it may be a function of the rotation speed of the internal combustion engine 1 of a gear engaged in a gearbox which receives motion from the internal combustion engine 1.

It should be noted that the supercharging pressure P and the supercharging ratio RP are sufficiently equivalent to each other, since the pressure upstream of compressor 14 (which may or may not coincide with the atmospheric pressure $P_{atm}$) is approximately constant and has a value around the unit value; then, using the supercharging ratio RP is equivalent to using the supercharging pressure P and vice versa. In the control scheme shown in FIG. 4 and described above, the supercharging ratio RP is used, but as set forth in an equivalent embodiment, the supercharging pressure P may be used instead of the supercharging ratio RP.

In the embodiment described above, the control law CL provides an objective opening WG of the solenoid valve 35 controlling the wastegate valve 16 as a function of a supercharging pressure P (or rather a supercharging ratio RP which is equal to the ratio between the supercharging pressure P and the pressure upstream of compressor 14 which may or may not coincide with the atmospheric pressure $P_{atm}$) and of a reduced mass flow rate $M_R$ of compressor 14; as set forth in an equivalent embodiment, the control law CL provides an objective opening WG of the solenoid valve 35 controlling the wastegate valve 16 as a function of a power supplied by the internal combustion engine 1 and of a volumetric efficiency of the internal combustion engine 1, or as a function of a rotation speed of the internal combustion engine 1 and of a volumetric efficiency of the internal combustion engine 1 (of course, different combinations of the parameters of the internal combustion engine 1 are also possible).

The electronic control unit 21 is further suited to control the supercharged internal combustion engine 1 so as to reduce as much as possible the phenomenon known as turbo lag, i.e. the delay in the response of the supercharging by turbocharger 12.

In particular, the electronic control unit 21 is suited to control the supercharged internal combustion engine 1 for operating in "scavenging" mode, in which a significant air flow is provided from the intake manifold 4 directly into the exhaust conduit 10 of the internal combustion engine 1.

Two different operating configurations are therefore possible, of which a first configuration hereafter referred to as normal or conventional configuration and a second configuration hereafter referred to as scavenging configuration, in which there is a significant air flow to the intake manifold 4 directly in the exhaust conduit 10 of the internal combustion engine 1.

Typically, the air flow from the intake manifold 4 directly into the exhaust conduit 10 is implemented by a suitable timing of the intake valves which connect each cylinder 3 to the intake manifold 4 and of the exhaust valves connect each cylinder 3 to the exhaust manifold 5 to allow the flow of fresh air directly from the intake manifold 4 to the exhaust manifold 5 and hence in the exhaust conduit 10 of the internal combustion engine 1.

The implementation of the intake valves which connect each cylinder 3 to the intake manifold 4 and of the exhaust valves which connect each cylinder 3 to the exhaust manifold 5 may be accomplished by a known actuator, such as a VVT (Variable Valve Timing) actuator, or even with an electromagnetic or electrohydraulic camless actuator.

As set forth in a further variant, the electronic control unit 21 is further suited to control the supercharged internal combustion engine 1 so as to increase the mass and volume flow rate of air and/or exhaust gases which flow through compressor 14 and turbine 13, with respect to the air flow rate actually used by the supercharged internal combustion engine 1 in combustion to generate the desired power.

In order to implement the above control strategy, the electronic control unit 21 is suited to differentiate the management of cylinders 3, in particular, to differentiate the flow rate of the intake air and of the air trapped in each cylinder 3, and to differentiate the mode of operation. The electronic control unit 21 is suited to generate the objective torque required by the vehicle's driver with only a part of cylinders 3 in combustion, while the remaining cylinders 3 draw as much air as possible. For example, in a supercharged internal combustion engine 1 with four cylinders 3, two cylinders 3 are active and produce the desired torque by drawing a mass of air that is approximately twice the mass of air they would draw in normal operating conditions (that is to say, if all four cylinders 3 were active). The remaining two cylinders 3 are not active and are controlled to draw the maximum air but are not involved in the combustion. Since the mass of air that flows through the two non active cylinders does not participate in the combustion, it flows directly from the intake manifold to the exhaust.

Two different operating configurations are therefore possible, of which a first configuration with four cylinders active in the combustion (hereafter referred to as normal configuration) and a second configuration with two cylinders 3 active in the combustion and two cylinders 3 which are controlled in intake but are not involved in the injection and combustion (hereafter referred to as "scavenging" configuration or mode).

The strategies for controlling the scavenging or virtual scavenging configuration and the normal configuration are described in patent applications BO2012A000322, BO2012A000323, and BO2012A000324 and fully incorporated herein by reference.

The control law CL which provides the open loop contribution $WG_{OL}$ in the calculation block 37 is described hereafter.

In particular, the open loop contribution $WG_{OL}$ in the calculation block 37 allows obtaining an open loop contribution $WG_{OL}$ corrected as a function of the "scavenging" mode, in which a significant air flow is provided from the intake manifold 4 directly into the exhaust conduit 10 of the internal combustion engine 1.

Figure 5:
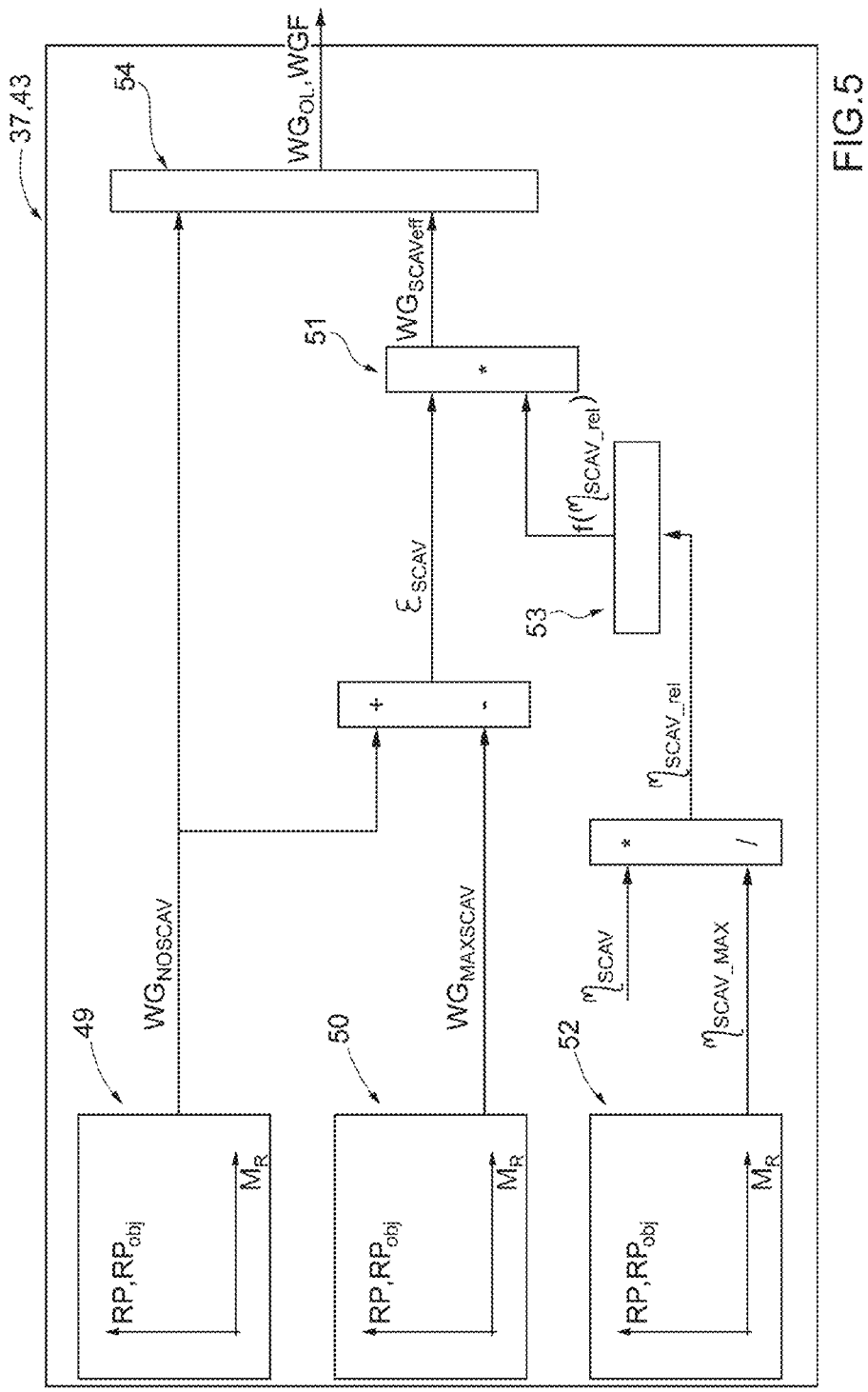

As shown in FIG. 5, the contribution $WG_{NOSCAV}$ in the absence of the "scavenging" mode, i.e. in the absence of a significant air flow from the intake manifold 4 directly into the exhaust conduit 10 of the internal combustion engine 1, is determined in the calculation block 49. An objective compression ratio $RP_{obj}$ (which is equal to the ratio between the objective supercharging pressure $P_{obj}$ and the pressure upstream of compressor 14 which may or may not coincide with the atmospheric pressure $P_{atm}$) is determined as a function of the objective supercharging pressure; then, the objective compression ratio and the actual reduced mass flow rate $M_R$ are provided to the calculation block 49 which provides the contribution $WG_{NOSCAV}$ in the absence of the "scavenging" mode.

The contribution $WG_{MAXSCAV}$ in maximum "scavenging" mode conditions, i.e. when the air flow from the intake manifold 4 directly into the exhaust conduit 10 of the internal combustion engine 1 is the maximum possible, is determined in the calculation block 50. An objective compression ratio $RP_{obj}$ (which is equal to the ratio between the objective supercharging pressure $P_{obj}$ and the pressure upstream of compressor 14 which may or may not coincide with the atmospheric pressure $P_{atm}$) is determined as a function of the objective supercharging pressure; then, the objective compression ratio and the actual reduced mass flow rate $M_R$ are provided to a calculation block 50 which provides the contribution $WG_{MAXSCAV}$ in maximum "scavenging" mode conditions.

The contribution $WG_{MAXSCAV}$ in maximum "scavenging" mode conditions thus corresponds to the position that the wastegate valve 16 should have as set forth in the control law CL (thus affected by all the errors of the control law CL) in conjunction with the maximum air flow from the intake manifold 4 directly into the exhaust conduit 10 of the internal combustion engine 1.

The contribution $WG_{NOSCAV}$ in the absence of "scavenging" mode, on the other hand, corresponds to the position that the wastegate valve 16 should have as set forth in the control law CL (thus affected by all the errors of the control law CL) in the absence of air flow from the intake manifold 4 directly into the exhaust conduit 10 of the internal combustion engine 1.

The contribution $WG_{NOSCAV}$ in the absence of the "scavenging" mode is compared with the contribution $WG_{MAXSCAV}$ in maximum "scavenging" mode conditions. In particular, a "scavenging" contribution $\epsilon_{SCAV}$ is calculated by calculating the difference between the contribution $WG_{MAX-}$ $_{SCAV}$ in maximum "scavenging" mode conditions and the contribution $WG_{NOSCAV}$ in the absence of "scavenging" mode and such a "scavenging" contribution $\epsilon_{SCAV}$ is provided to a calculation block 51.

The efficiency $\eta_{SCAV\_MAX}$ in maximum "scavenging" mode conditions, i.e. when the air flow from the intake manifold 4 directly into the exhaust conduit 10 of the internal combustion engine 1 is maximum, is determined in the calculation block 52. An objective compression ratio $RP_{obj}$ (which is equal to the ratio between the objective supercharging pressure $P_{obj}$ and the pressure upstream of compressor 14 which may or may not coincide with the atmospheric pressure $P_{atm}$) is determined as a function of the objective supercharging pressure; then, the objective compression ratio and the actual reduced mass flow rate $M_R$ are provided to a calculation block 52 which provides the efficiency $\eta_{SCAV\_MAX}$ in maximum "scavenging" mode conditions.

The efficiency $\eta_{SCAV\_MAX}$ in maximum "scavenging" mode conditions is compared with the "scavenging" efficiency $\eta_{SCAV}$ of cylinders 3 obtained by the ratio between the mass flow rate m, advantageously the reduced mass flow rate, of total air flowing through the internal combustion engine 1 and the mass flow rate $m_{com}$ of air trapped in cylinders 3, which participates in the combustion.

In particular, a relative "scavenging" efficiency $\eta_{SCAV\_rel}$ obtained from the ratio between the "scavenging efficiency $\eta_{SCAV}$ and the efficiency $\eta_{SCAV\_MAX}$ in maximum "scavenging" mode conditions is calculated and such a "scavenging" efficiency $\eta_{SCAV\_rel}$ is provided to a calculation block 53.

A factor $f(\eta_{SCAV\_rel})$ is determined in block 53 which is a function of the relative "scavenging" efficiency $\eta_{SCAV\_rel}$ described above.

The factor $f(\eta_{SCAV\_rel})$ which is a function of the relative "scavenging" efficiency $\eta_{SCAV\_rel}$ is compared in the calculation block 51 with the "scavenging" contribution $\epsilon_{SCAV}$.

In particular, an actual contribution $WG_{SCAVeff}$ obtained by the product between factor $f(\eta_{SCAV\_rel})$ is calculated, which is a function of the relative "scavenging" efficiency $\eta_{SCAV\_rel}$ and the "scavenging" contribution $\epsilon_{SCAV}$. The actual contribution $WG_{SCAVeff}$ obtained by the product of factor $f(\eta_{SCAV\_rel})$ and the "scavenging" contribution $\epsilon_{SCAV}$ is an indicator of the quantity of air that flows from the intake manifold 4 directly into the exhaust conduit 10 of the internal combustion engine 1; that is, it represents the contribution in controlling the solenoid valve 35 controlling the wastegate valve 16 due solely to the "scavenging" mode.

Then, the actual contribution $WG_{SCAVeff}$ in "scavenging" mode conditions is determined in the calculation block 51 and then added in the calculation block 54 to the contribution $WG_{NOSCAV}$ in the absence of the "scavenging" mode to obtain the open loop contribution $WG_{OL}$ in the calculation block 37.

Figure 6:
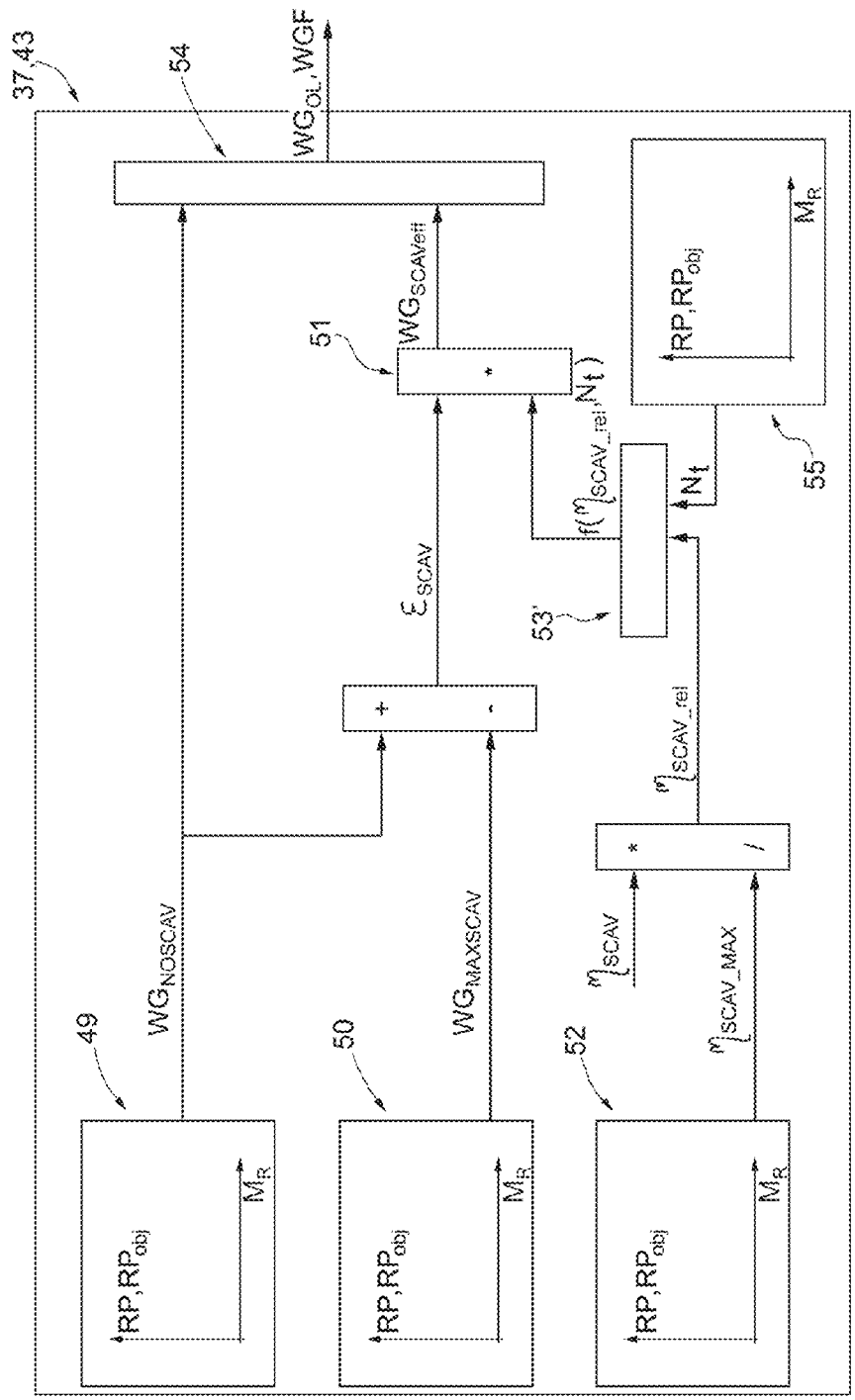

FIG. 6 shows a block diagram totally similar to the block diagram in FIG. 5 which provides the open loop contribution $WG_{OL}$ in the calculation block 37 and where possible, common parts are indicated with the same reference numerals.

FIG. 6 includes a calculation block 55 which determines the rotation speed $N_t$ of turbocharger 12 starting from some characteristic maps, which are typically provided by the manufacturer of turbocharger 12, as a function of the objective compression ratio $RP_{obj}$ and of the actual reduced mass flow rate $M_R$.

In other words, an objective compression ratio $R_{obj}$ (which is equal to the ratio between the objective supercharging pressure $P_{obj}$ and the pressure upstream of compressor 14 which may or may not coincide with the atmospheric pressure $P_{atm}$) is determined as a function of the objective supercharging pressure; then, the objective compression ratio $RP_{obj}$ and the actual reduced mass flow rate $M_R$ are provided to the calculation block 55 which provides the rotation speed $N_t$ of turbocharger 12.

Such a rotation speed $N_t$ of turbocharger 12 is provided to a calculation block 53'.

The relative "scavenging" efficiency $\eta_{SCAV\_rel}$ obtained from the ratio between the efficiency $\eta_{SCAV\_MAX}$ in maximum "scavenging" mode conditions and the "scavenging" efficiency $\eta_{SCAV}$ is provided to the calculation block 53' together with the rotation speed $N_t$ of turbocharger 12.

A factor $f(\eta_{SCAV\_rel}, N_t)$ is determined in the calculation block 53' which is a function of both the relative "scavenging" efficiency $\eta_{SCAV\_rel}$, i.e. the ratio between the efficiency $\eta_{SCAV\_MAX}$ in maximum "scavenging" mode conditions and the "scavenging" efficiency $\eta_{SCAV}$, and of the rotation speed $N_t$ of turbocharger 12.

The above method for determining the open loop contribution $WG_{OL}$ in the calculation block 37 may be used in combination with the method of correction of the reduced mass flow rate $M_R$ of a compressor 14 in a turbocharged internal combustion engine 1 described in patent application BO2013A000480, entirely incorporated herein by reference.

The control law CL described above further allows using the open loop contribution $WG_{OL}$ of the objective position $WG_{obj}$ of actuator 35 controlling the wastegate valve 16 obtained in the calculation block 37 for determining the closed loop contribution $WG_{CL1}$.

In other words, the control law CL described above is used in the calculation block 43 to provide the fictitious position WGF of the wastegate valve 16 which is in turn used to determine the closed loop contribution $WG_{CL1}$. The control law CL used in the calculation block 43 differs from the control law CL used in block 37 only in that the actual supercharging pressure P or rather the actual supercharging ratio RP is used instead of the objective compression ratio $RP_{obj}$.

The method of determining the open loop contribution $WG_{OL}$ in the calculation block 37 described may find advantageous application not only to control the solenoid valve 35 controlling the wastegate valve 16, or to determine an objective position $WG_{obj}$ of the solenoid valve 35 controlling the wastegate valve 16, but also in the case of a mechanical adjustment of the wastegate valve 16 (for example by an electromechanical actuator) to determine an objective position $WG_{obj}$ of the wastegate valve 16 itself.

The above method for determining the open loop contribution $WG_{OL}$ in the calculation block 37 has several advantages. In particular, it allows calculating an open loop contribution $WG_{OL}$ corrected as a function of the "scavenging" mode, i.e. as a function of the quantity of air that actually flows from the intake manifold 4 directly into the exhaust conduit 10 of the internal combustion engine 1 in an effective way but, at the same time, it is simple and cost-effective to be implemented in an electronic control unit 21 of an internal combustion engine 1 as it uses measurements provided by sensors which are frequently present in modern internal combustion engines 1 and does require neither a large computing capacity nor a large memory. Furthermore, the above method of calculating the open loop contribution $WG_{OL}$ corrected as a function of the "scavenging" mode allows making the control of the wastegate valve 16 sturdy, ready and free from oscillations in all operating conditions; in particular, also in the operating condition in which there is a significant air flow from the intake manifold directly to the exhaust of the internal combustion engine 1.

What is claimed is:

1. A method to control a wastegate valve in an internal combustion engine turbocharged by a turbocharger provided with a turbine and with a compressor; the internal combustion engine comprising a number of cylinders, an intake manifold and an exhaust manifold and being suited to allow air to directly flow from the intake manifold to the exhaust manifold such that a pressure upstream of the compressor can be measured; the method comprises:
   determining an objective supercharging pressure;
   measuring an actual supercharging pressure;
   experimentally determining a control law for obtaining an objective value for an opening of a solenoid valve controlling the wastegate valve by determining a first objective opening
   of the solenoid valve corresponding to a position of the wastegate valve in an absence of air flowing from the intake manifold directly into the exhaust manifold; and
   by determining a second objective opening of the solenoid valve corresponding to a position of the wastegate valve when a quantity of air is flowing from the intake manifold into the exhaust manifold; wherein the control law is a data map or table or a mathematical function;
   wherein the first objective opening of the solenoid valve is calculated as a function of an actual reduced mass flow rate and an objective compression ratio which is equal to a ratio between the objective supercharging pressure and the pressure upstream of the compressor; and
   wherein the second objective opening of the solenoid valve is calculated as a function of an indicator of the quantity of air flowing from the intake manifold to the exhaust manifold, the actual reduced mass flow rate and the objective compression ratio;
   calculating the objective value for the opening of the solenoid valve controlling the wastegate valve by adding a first contribution and a second contribution, wherein the first contribution is an open loop contribution and the second contribution is a closed loop contribution; the step of calculating further including the sub steps of:
   determining the first contribution based on the first objective opening of the solenoid valve and the second objective opening of the solenoid; and
   determining the second contribution by using a fictitious position of the wastegate valve as a feedback variable in the control law and comparing the second closed loop contribution with the first contribution;
   wherein the fictitious position of the wastegate valve is based on the first objective opening of the solenoid valve and the second objective opening of the solenoid valve.

2. The control method according to claim 1, further including providing a third contribution which represents a position that the wastegate valve has in conjunction with the air flowing from the intake manifold directly into the exhaust manifold; wherein the third and the first contributions are variable as a function of a mass flow rate of the compressor and the objective compression ratio or an actual compression ratio resulting from a ratio between the actual supercharging pressure and the pressure upstream of the compressor.

3. The control method according to claim 1 further comprising:

determining the second contribution as a function of the third contribution.

4. The control method according to claim 1 further comprising:
determining the second contribution as a function of the first contribution.

5. The control method according to claim 1 further comprising:
determining the second contribution as a function of a difference between the third contribution and the first contribution.

6. The control method according to claim 1 further comprising:
determining an indicator of the quantity of air directly flowing from the intake manifold to the exhaust manifold; and
determining the second contribution using the indicator of the quantity of air directly flowing from the intake manifold to the exhaust manifold.

7. The control method according to claim 5 further comprising:
determining the second contribution by determining a product between the indicator of the quantity of air directly flowing from the intake manifold to the exhaust manifold and the difference between the third contribution and the first contribution.

8. The control method according to claim 6 further comprising:
determining a rotation speed of the turbocharger as a function of the objective compression ratio and of a mass flow rate of the compressor and determining the indicator as a function of the rotation speed of the turbocharger.

9. The control method according to claim 8 further comprising:
determining the rotation speed of the turbocharger as a function of the mass flow rate of the compressor and the objective compression ratio or an actual compression ratio resulting from a ratio between the actual supercharging pressure and the pressure upstream of the compressor.

10. The control method according to claim 6 further comprising:
determining the indicator as a function of the ratio between an actual efficiency calculated from the ratio between a mass flow rate of total air flowing through the internal combustion engine and a mass flow rate of air trapped in the cylinders, which participates in the combustion, and an efficiency under conditions of air flowing directly from the intake manifold to the exhaust manifold.

11. The control method according to claim 10, wherein the efficiency under conditions of air flowing directly from the intake manifold to the exhaust manifold can vary as a function of a mass flow rate of the compressor and the objective compression ratio or an actual compression ratio resulting from a ratio between the actual supercharging pressure and the pressure upstream of the compressor.

12. The control method according to claim 1, wherein determining the second contribution further comprises:
determining an opening of the solenoid valve controlling the wastegate valve which corresponds to a position that the wastegate valve has in conjunction with the supercharging ratio and the actual reduced mass flow rate of the compressor;
calculating an opening error by determining a difference between the first contribution and the opening of the solenoid valve corresponding to the position of the wastegate valve has in conjunction with the supercharging ratio and the reduced mass flow rate of the compressor; and
determining the second contribution as a function of the opening error.

* * * * *